UNITED STATES PATENT OFFICE.

CARL HARTMANN, OF SCHLEBUSCH, NEAR COLOGNE, GERMANY, ASSIGNOR TO THE FIRM OF SPRENGSTOFF A.-G. CARBONIT, OF HAMBURG, GERMANY.

PROCESS FOR MANUFACTURING EXPLOSIVES.

1,135,792.     Specification of Letters Patent.     Patented Apr. 13, 1915.

No Drawing.     Application filed August 20, 1913. Serial No. 785,779.

*To all whom it may concern:*

Be it known that I, CARL HARTMANN, a subject of the German Emperor, and resident of Schlebusch, near Cologne-on-the-Rhine, Germany, have invented a certain new and useful Process for Manufacturing Explosives, of which the following is a specification.

As is known the formation of nitro derivatives of di-phenyl sulfid $C_6H_5$—S—$C_6H_5$ is carried out by treating nitrated chloro benzols with alkali sulfates. This method entails numerous defects and furnishes a poor yield. An improved method of producing 2.4.2'.4'- tetra-nitrodiphenyl-sulfid is described in German Patent No. 94077 of Class 12. The method there described is based upon the reaction of 2 molecules of 1 chloro-2.4.-dinitrobenzol with 2 molecules of thiosulfate in accordance with the equation:

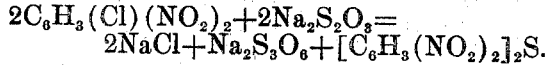

If the attempt is made to obtain the 2.4.6.2'.4'.6'-hexa-nitrodiphenyl-sulfid in the same manner by the reaction of thio-sulfates upon 1 chloro-2.4.6.-tri-nitrobenzol, only a dark brown product is obtained which does not represent the desired compound. Now it has been found that the hexa compound can be formed if in place of 2 molecules of thio-sulfate only 1 molecule of thiosulfate is caused to act upon 2 molecules of chloro-trinitrobenzol, the reaction being carried out in the reverse order to that indicated in the said patent. The reaction then occurs in accordance with the following equation:

As the sulfuric acid liberated produces a secondary reaction upon the thio-sulfate, it is necessary to neutralize the acid which can readily be effected by the addition of carbonates of the alkalis, earthy alkalis and of magnesium. The reaction is therefore quite different from that in the process disclosed by the said German patent and a perfectly novel and unexpected reaction takes place. The inventive idea resides in utilizing the greater capacity for reaction of the chlorin atom resulting from the third nitro group contained in the 1-chloro-2.4.6-trinitrobenzol, by employing but a single molecule of thio-sulfate.

Example: 100 kg. of 1-chloro-2.4.6.-trinitrobenzol and 19 kg. of magnesium carbonate are heated to boiling point with four times the quantity of alcohol in a boiler provided with a reflux cooler and slowly mixed with 50 kg. of sodium thiosulfate while constantly agitating and heating. The reaction takes place readily with vigorous development of carbonic acid. The 2.4.6.2'.4'.6' hexa-nitro-diphenyl sulfid separated

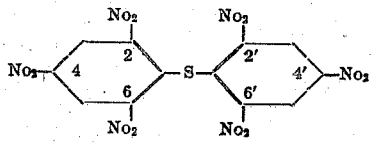

rated is treated in a centrifugan apparatus, washed with alcohol, dilute hydrochloric acid and water and then dried. The yield amounts to approximately 90% of the theoretical yield. The result is a pure yellow product with the melting point and the properties indicated in *Beilstein*, third edition, Vol. II, paragraph 3 from the bottom page 803. Any small excess of thiosulfate, however, produces a decomposition characterized by dark coloration.

The resultant novel product of hexa-nitro-diphenyl sulfid presents explosive properties and can therefore be used with advantage for the manufacture of explosives, especially in the manufacture of charges for projectiles, mines, torpedoes, fuses, detonating caps and the like. The advantages presented by this product as compared with the substances generally employed for this purpose, are as follows:

1. Great chemical stability: Hexa-nitro diphenylsulfid is completely insoluble in water and is not decomposed when boiled with water. Even when boiled with soda lye the body does not experience any decomposition, which differentiates it from all other known aromatic nitro bodies. Even at high temperatures this body is very stable. Explosion takes place only at 290° centigrade, without the slightest decomposition phenomena arising previously.

2. Great explosive effect: The deformation in a lead sphere 40 mm. in diameter amounts: With 50 grams of gun cotton with 20% of water 1400 ccm. With 50 gr. of trinitrotoluol 1480 ccm. With 50 gr. of picric acid 1530 ccm. With 50 gr. of hexanitrodiphenylsulfid 1630 ccm.

Accordingly, hexa-nitro-diphenyl sulfid is of greater power than all explosives hitherto used for the same purposes, being more powerful by $\frac{1630}{1480} = 1.1$ times than tri-nitro toluol which has hitherto been most generally used.

3. Capacity for compression: Hexa-nitro-diphenyl sulfid can be subjected to a pressure of 3000 kg. per square centimeter without danger and does not lose its high detonating capacity in this condition. If a pressure of 2000 kg. per square centimeter be employed, a density of 1.7 is reached, in which respect this novel explosive is superior to other explosives. As compared with tri-nitro-toluol with the ordinary density of 1.6, this amounts to a greater force of $\frac{1.7}{1.6} = 1.06$. In conjunction with the 1.1 times greater force in the lead block there is therefore a total advantage of 1.17, that is to say of 17%.

4. The formation of free sulfurous acid in detonating: The free sulfurous acid contained in the gases upon detonation renders it impossible for any human being to remain in any closed space, such as the casemate, interior of a ship or the like that has been struck by the projectile.

5. Contrary to what is the case with most of the aromatic nitro bodies, hexa-nitro-diphenyl sulfid does not color yellow and is not poisonous.

This property renders it easy to use the explosive for charges and particularly differentiates it from hexa-nitro-diphenyl-amin which is used.

It is known in the usual mercury fulminate caps to replace a portion of the mercury fulminate by aromatic nitro-bodies, particularly tri-nitro-toluol and tetra-nitro-methyl-anilin. Hexa-nitro-diphenyl-sulfid is especially suited for replacing these aromatic nitro bodies, as it presents a considerably greater explosive effect than tri-nitro-toluol and greater security against shocks and blows and greater chemical stability than tetra-nitro-methyl-anilin.

An explosive or gun-powder will consist of hexa-nitro di-phenyl sulfid mixed or incorporated with other substances such as heretofore have been incorporated with other nitro-explosives, such as hydrocarbons, carbids and oxygen vehicles. The amount of hexa-nitro-diphenyl sulfid in the mixture is dependent upon the result desired to be obtained, as with other high explosives.

What I claim and desire to secure by Letters Patent of the United States is:—

1. A process for the manufacture of 2.4.6.2'.4'.6'.-hexa-nitro-diphenyl-sulfid, which consists in heating two molecules of 1-chloro-2.4.6-trinitro-benzol with one molecule of a thio-sulfate in the presence of an appropriate solvent and an acid neutralizing means.

2. A process for the manufacture of 2.4.6.2'.4'.6'-hexa-nitro-diphenyl-sulfid, which consists in reacting upon a mixture of 1-chloro-2.4.6.-trinitro-benzol, magnesium carbonate and alcohol with sodium thiosulfate while constantly agitating and heating.

CARL HARTMANN.

Witnesses:
HANS DUMONT,
LOUIS VANDORN.